United States Patent
Cheong et al.

(10) Patent No.: US 10,136,348 B2
(45) Date of Patent: Nov. 20, 2018

(54) METHOD AND APPARATUS FOR PERFORMING WIRELESS COMMUNICATION BASED ON HETEROGENEOUS INTERFERENCE ALIGNMENT (IA) SCHEME IN WIRELESS LOCAL AREA NETWORK (WLAN)

(71) Applicant: Electronics and Telcommunications Research Institute, Daejeon (KR)

(72) Inventors: Min Ho Cheong, Daejeon (KR); Hyoung Jin Kwon, Daejeon (KR); Sok Kyu Lee, Daejeon (KR); Jae Seung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 50 days.

(21) Appl. No.: 14/748,996

(22) Filed: Jun. 24, 2015

(65) Prior Publication Data

US 2015/0373727 A1    Dec. 24, 2015

(30) Foreign Application Priority Data

Jun. 24, 2014  (KR) .......................... 10-2014-0077335

(51) Int. Cl.
*H04W 24/10*    (2009.01)
*H04L 1/00*    (2006.01)
*H04W 88/02*    (2009.01)

(52) U.S. Cl.
CPC .......... *H04W 24/10* (2013.01); *H04L 1/0001* (2013.01); *H04W 88/02* (2013.01)

(58) Field of Classification Search
None
See application file for complete search history.

(56) References Cited

U.S. PATENT DOCUMENTS

| 2013/0188571 | A1 | 6/2013 | Cheong et al. | |
| 2013/0267266 | A1 | 10/2013 | Park et al. | |
| 2014/0294109 | A1* | 10/2014 | Cheong | H04B 7/0413 375/267 |
| 2014/0294110 | A1* | 10/2014 | Cheong | H04W 52/243 375/267 |

(Continued)

OTHER PUBLICATIONS

Lertwiram, N. et al., "A Study of Trade-Off Between Opportunistic Resource Allocation and Interference Alignment in Femtocell Scenarios," IEEE Wireless Communications Letters, vol. 1, No. 4, Aug. 2012, pp. 356-359.*

*Primary Examiner* — Donald L Mills

(57) ABSTRACT

Provided is a method and apparatus for performing a wireless communication based on a heterogeneous interference alignment (IA) scheme for a downlink multi-user multiple-input and multiple-output (DL MU-MIMO) communication in a wireless local area network (WLAN), and a wireless communication method employing a hybrid scheme that may include storing maximum throughputs of IA schemes, measuring an environment of a wireless network, calculating predicted throughputs of the IA schemes based on the measured environment of the wireless network, selecting an IA scheme from among the IA schemes based on the predicted throughputs, and communicating with a user terminal based on the selected IA scheme.

9 Claims, 9 Drawing Sheets

(56) References Cited

U.S. PATENT DOCUMENTS

2015/0036623 A1* 2/2015 Maaref ................... H04L 1/004
    370/329
2015/0372726 A1* 12/2015 Cheong ................ H04B 7/0617
    375/267

* cited by examiner

| SNR | OIA | Iterative IA(10) |
|---|---|---|
| 0 | 13.7736 | 2.652 |
| 5 | 14.4208 | 6.0591 |
| 10 | 21.834 | 11.3454 |
| 15 | 23.8905 | 18.4292 |
| 20* | 24.6133 | 25.7827 |
| 25 | 24.6726 | 33.105 |
| 30 | 24.8819 | 38.2673 |
| 35 | 24.8523 | 42.2652 |
| 40 | 24.993 | 44.0798 |
| 45 | 24.7334 | 44.9601 |
| 50 | 24.9592 | 45.3774 |

METHOD AND APPARATUS FOR PERFORMING WIRELESS COMMUNICATION BASED ON HETEROGENEOUS INTERFERENCE ALIGNMENT (IA) SCHEME IN WIRELESS LOCAL AREA NETWORK (WLAN)

CROSS-REFERENCE TO RELATED APPLICATION

This application claims the priority benefit of Korean Patent Application No. 10-2014-0077335, filed on Jun. 24, 2014, in the Korean Intellectual Property Office, the disclosure of which is incorporated herein by reference.

BACKGROUND

Field of the Invention

Example embodiments of the present invention relate to a method of performing a wireless communication in a downlink multi-user multiple-input and multiple-output (DL MU-MIMO) communication in a wireless local area network (WLAN), and more particularly, to a method and apparatus for performing a wireless communication using one of an opportunistic interference alignment (OIA) and an iterative interference alignment (IA) in consideration of a throughput based on a signal-to-noise ratio (SNR).

Description of the Related Art

Recently, interference alignment (IA) schemes for performing a wireless communication by aligning each of a signal to be received and unintended interference in a different space are suggested to solve an issue that a high channel capacity is not achievable due to interference between user terminals.

Among the IA schemes, an opportunistic interference alignment (OIA) may be a scheme for improving degrees of freedom (DOF) in an entire network by providing a transmission opportunity to a user terminal of which interference is most appropriately aligned among numerous user terminals based on a multi-user diversity.

Also, among the IA schemes, an iterative IA may be a scheme for performing an IA using only local channel knowledge through repetitive channel information transmissions between a transmitting end and a receiving end based on a cognitive principle and reciprocity of a channel.

The OIA may result in a phenomenon of increasing a sum-rate at a relatively high signal-to-noise ratio (SNR) in which an interference influence is more dominant than a noise influence. The iterative IA may result in a phenomenon of decreasing the sum-rate at a to relatively low SNR in which the noise influence is more dominant than the interference influence.

Accordingly, there is a desire for a method of complementing the OIA and the iterative IA.

SUMMARY

An aspect of the present invention provides a method and apparatus for selectively applying an opportunistic interference alignment (OIA) and an iterative interference alignment (IA) to complement issues of IA schemes, thereby improving a maximum throughput in a wireless communication.

Another aspect of the present invention also provides a method and apparatus for adaptively performing a communication based on an environment of a wireless network by applying an appropriate IA scheme in consideration of a signal-to-noise ratio (SNR).

Still another aspect of the present invention also provides a method and apparatus for performing a wireless communication by calculating a predicted throughput based on a message negotiation duration and selecting an advantageous IA scheme.

According to an aspect of the present invention, there is provided a wireless communication method including measuring an environment of a wireless network, calculating predicted throughputs of an OIA and an iterative IA based on the environment of the wireless network, selecting an IA scheme from between the OIA and the iterative IA based on the predicted throughputs, and communicating with a user terminal based on the selected IA scheme.

The calculating may include calculating the predicted throughputs of the OIA and the iterative IA in consideration of a frame overhead based on the IA scheme and the environment of the wireless network.

The calculating may include calculating the predicted throughputs of the OIA using a sum-rate based on the environment of the wireless network, a frame period, and a scheduling time of the OIA.

The calculating may include calculating the predicted throughput of the iterative IA using a sum-rate based on the environment of the wireless network, a frame period, an iteration time, a number of iterations of the iterative IA.

The measuring may include measuring at least one of a number of transmission antennas, a number of reception antennas, a number of communication apparatuses, a number of user terminals per basic service set (BSS), and a target SNR in the wireless network.

According to another aspect of the present invention, there is also provided a wireless communication method including accessing a communication apparatus to communicate, and communicating with the communication apparatus based on an IA scheme, wherein the IA scheme is obtained by calculating predicted throughputs of an OIA and an iterative IA based on an environment of a wireless network measured by the communication apparatus and selecting one of the OIA and the iterative IA based on the predicted throughputs.

The predicted throughputs of the OIA and the iterative IA may be calculated based on a frame overhead based on the IA scheme and the environment of the wireless network.

The predicted throughput of the OIA may be calculated using a sum-rate based on the environment of the wireless network, a frame period, and a scheduling time of the OIA.

The predicted throughput of the iterative IA may be calculated using a sum-rate based on the environment of the wireless network, a frame period, an iteration time, and a number of iterations of the iterative IA.

The environment of the wireless network may include at least one of a number of transmission antennas, a number of reception antennas, a number of communication apparatuses, a number of user terminals per BSS, and a target SNR in the wireless network.

According to still another aspect of the present invention, there is also provided a communication apparatus including a measurer to measure an environment of a wireless network, a calculator to calculate predicted throughputs of an OIA and an iterative IA based on the environment of the wireless network, a selector to select an IA scheme from between the OIA and the iterative IA based on the predicted throughputs, and a communicator to communicate with a user terminal based on the selected IA scheme.

The calculator may calculate the predicted throughputs of the OIA and the iterative IA in consideration of a frame overhead based on the IA scheme and the environment of the wireless network.

The calculator may calculate the predicted throughputs of the OIA using a sum-rate based on the environment of the wireless network, a frame period, and a scheduling time of the OIA.

The calculator may calculate the predicted throughput of the iterative IA using a sum-rate based on the environment of the wireless network, a frame period, an iteration time, and a number of iterations of the iterative IA.

The measurer may measure at least one of a number of transmission antennas, a number of reception antennas, a number of communication apparatuses, a number of user terminals per BSS, and a target SNR in the wireless network.

According to yet another aspect of the present invention, there is also provided a user terminal including an accessor to access a communication apparatus to communicate, and a communicator to communicate with the communication apparatus based on an IA scheme, wherein the IA scheme is obtained by calculating predicted throughputs of an OIA and an iterative IA based on an environment of a wireless network measured by the communication apparatus and selecting one of the OIA and the iterative IA based on the predicted throughputs.

The predicted throughputs of the OIA and the iterative IA may be calculated in consideration of a frame overhead based on the IA scheme and the environment of the wireless network.

The predicted throughput of the OIA may be calculated using a sum-rate based on the environment of the wireless network, a frame period, and a scheduling time of the OIA.

The predicted throughput of the iterative IA may be calculated using a sum-rate based on the environment of the wireless network, a frame period, an iteration time, and a number of iterations of the iterative IA.

The environment of the wireless network may include at least one of a number of transmission antennas, a number of reception antennas, a number of communication apparatuses, a number of user terminals per BSS, and a target SNR of the wireless network.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
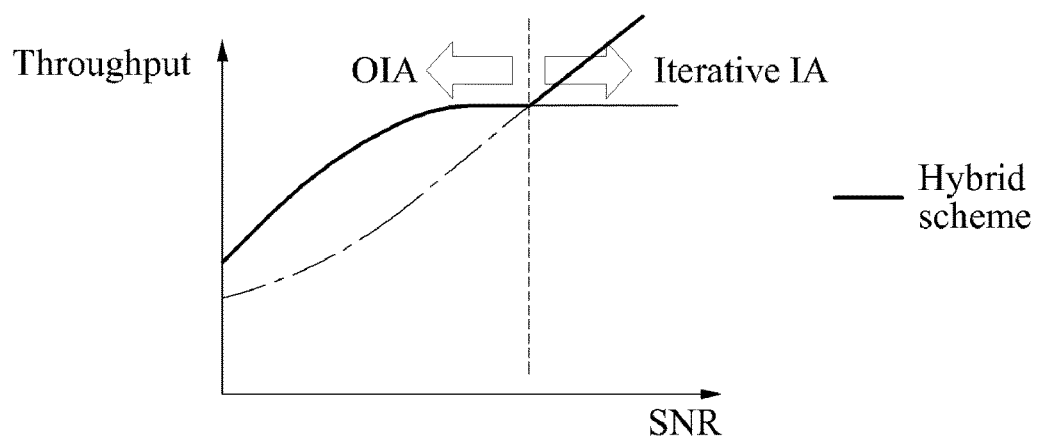
FIG. 1 illustrates an example of selecting an interference alignment (IA) scheme based on a signal-to-noise ratio (SNR) according to an example embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates an example of selecting an interference alignment (IA) scheme based on a signal-to-noise ratio (SNR) according to an example embodiment.

The IA scheme may be, for example, technology for improving transmission efficiency by controlling interference between overlapping access points (APs) using an equal frequency in a wireless channel environment.

The IA scheme may be implemented based on various diversity aspects. For example, an IA may be a scheme of performing zero forcing by dividing a space into two portions such that a signal received from a transmitting end is aligned in one portion and an interference signal received from another transmitting end is aligned in another portion.

In the above IA scheme, an opportunistic interference alignment (OIA) may be used to acquire an increased multi-user diversity according to an increase in a number of user terminals included in a basic service set (BSS), thereby improving a maximum throughput, for example, an achievable throughput. When compared to an iterative IA, The OIA may derive a higher maximum throughput at a low SNR at which an influence of interference is less than an influence of noise. In this example, the BSS may refer to, for example, a group including an AP and a user terminal connected to the AP.

Also, the OIA may cause a phenomenon of the maximum throughput saturated at a high SNR at which the influence of interference is more dominant than the influence of noise. Thus, the OIA may be appropriate to be used at the low SNR.

In the above IA scheme, the iterative IA may be generally used to perform an accurate IA in an environment having a BSS including a relatively small number of user terminals For example, using the iterative IA, interference between transmitted signals may be cancelled through repetitive channel information transmissions performed between a transmitting end and a receiving end.

At the low SNR, a beam adjustment performed in consideration of a desired channel may be more efficient than an interference adjustment. Thus, the iterative IA may derive a lower maximum throughput at the low SNR when compared to the OIA.

A hybrid scheme may selectively use the aforementioned IA schemes. Thus, using the hybrid scheme, a wireless communication may be performed based on an IA scheme deriving a higher maximum throughput between the OIA and the iterative IA.

For example, using the hybrid scheme, an increased maximum throughput may be achieved by applying the OIA in lieu of the iterative IA. Based on an increase in the SNR, the interference adjustment may be considered as a more significant factor in improving the maximum throughput. Thus, using the hybrid scheme, a high maximum throughput may be achieved by applying the iterative IA at the high SNR. Concisely, a crossover phenomenon may occur between the OIA and the iterative IA based on a change in the SNR, and the hybrid scheme may be used to perform the wireless communication based on the crossover phenomenon.

Figure 2:
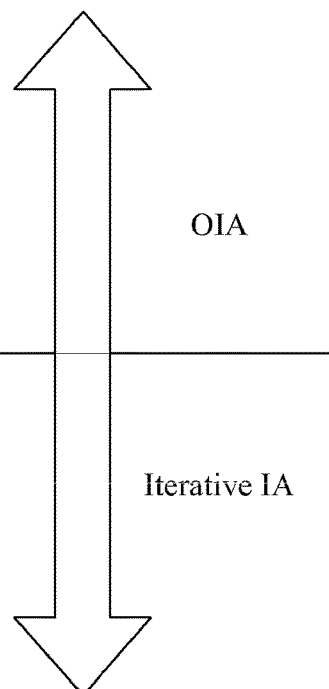
FIG. 2 illustrates a throughput table based on an IA scheme and an SNR according to an example embodiment.

FIG. 2 illustrates a throughput table based on an IA scheme and an SNR according to an example embodiment.

FIG. 2 illustrates a throughput table indicating a maximum throughput measured in an environment of a wireless network. In the environment, a number of APs, for example, K, is "3", a number of user terminals per BSS, for example, N, is "10", a number of antennas in an AP, for example, M, is "4", a number of antennas in a user terminal, for example, L, is "4", and a number of transmission streams per BSS, for example, S, is "2".

In the throughput table, an advantageous IA scheme may be changed at approximately 20 decibels (dB) SNR. For example, when an SNR is less than 20 dB, an OIA may derive a higher maximum throughput as compared to an iterative IA. Conversely, when the SNR is greater than 20 dB, the iterative IA may derive a higher maximum throughput as compared to the OIA.

Figure 3:
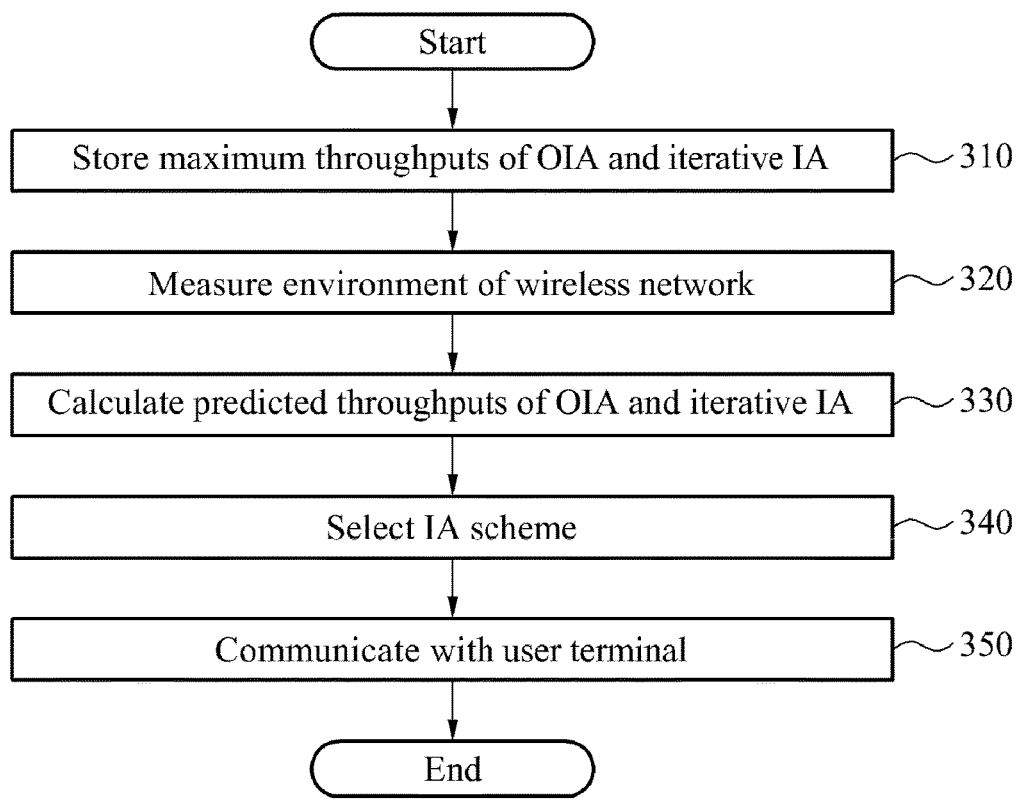
FIG. 3 illustrates a wireless communication method based on a hybrid scheme according to an example embodiment.

FIG. 3 illustrates a wireless communication method based on a hybrid scheme according to an example embodiment.

The wireless communication method may be implemented by a processor included in a communication apparatus. In this example, the communication apparatus may be configured to communicate with a user terminal and may include, for example, a base station, an AP, and a relay.

In operation 310, the communication apparatus stores maximum throughputs of an OIA and an iterative IA. For example, the communication apparatus may store the maximum throughputs of the OIA and the iterative IA in a memory in a form of a lookup table. In this example, the stored maximum throughputs may be used as a reference for determining whether the communication apparatus communicates with a user terminal based on the OIA or the iterative IA.

In operation 320, the communication apparatus measures an environment of a wireless network. In this example, the wireless network may be, for example, a BSS formed based on the communication apparatus.

As an example, in the wireless network, the communication apparatus may measure at least one of a number of transmission antennas, a number of reception antennas, a number of user terminals per BSS, a number of communication apparatuses, and a target SNR. In this example, the transmission antennas may indicate, for example, transmission antennas of the communication apparatuses, and the reception antennas may indicate, for example, reception antennas of the user terminals. Also, the target SNR may indicate, for example, an SNR of an environment in which the wireless communication is to be performed.

In operation 330, the communication apparatus calculates predicted throughputs of the OIA and the iterative IA based on the measured environment of the wireless network. The communication apparatus may calculate a predicted throughput for each IA scheme based on a different method. For example, the communication apparatus may calculate the predicted throughput for each IA scheme as shown in Equation 1.

$$\rho_{DLOIA} = \frac{(T_{frame} - \text{scheduling time}) \times \text{sum rate}_{DLOIA}(SNR, N, K, M, L)}{T_{frame}}$$

$$\rho_{iterativeIA} = \frac{(T_{frame} - \text{iteration number} \times \text{iteration time}) \times \text{sum rate}_{iterativeIA}(SNR, N, K, M, L)}{T_{frame}}$$

[Equation 1]

In Equation 1, $\rho_{DL\_OIA}$ denotes the predicted throughput of the OIA, and $\rho_{iterativeIA}$ denotes the predicted throughput of the iterative IA. $T_{frame}$ denotes a frame period, scheduling time may indicate a scheduling time of the OIA, and sum rate$_{DL\_OIA}$ may indicate a sum rate of the OIA. N denotes the number of user terminals per BSS, K denotes the number of communication apparatuses, M denotes the number of antennas in the communication apparatus, and L denotes the number of antennas in the user terminal. Also, iteration number may indicate a number of iterations of the iterative IA, iteration time may indicate an iteration time of the iterative IA, and sum rate$_{iterative\ IA}$ may indicate a sum rate of the iterative IA.

Each of sum rate$_{DL\_OIA}$ and sum rate$_{iterative\ IA}$ may be a function using the environment, for example, the SNR, N, K, M, and L, of the wireless network measured in operation 320 as a variable. For example, each of sum rate$_{DL\_OIA}$ and sum rate$_{iterative\ IA}$ may be a function reflecting a relationship in the environment of the wireless network obtained by simulating various combinations in the environment of the wireless network.

The communication apparatus may calculate the predicted throughput of the OIA using the sum-rate based on the environment of the wireless network, the frame period, and the scheduling time of the OIA. Additionally, the communication apparatus may calculate the predicted throughput of the iterative IA using the sum-rate based on the environment of the wireless network, the frame period, the iteration time, and the number of iterations of the iterative IA.

Also, the communication apparatus may calculate the predicted throughputs of the OIA and the iterative IA in consideration of a frame overhead for each IA scheme and the measured environment of the wireless network. In this example, the frame overhead for each IA scheme may be determined based on the scheduling time of the OIA, and the iteration time and the number of iterations of the iterative IA. Thus, each IA scheme may require a different frame overhead. Also, a tradeoff may occur between the maximum throughput and the frame overhead.

In operation 340, the communication apparatus selects an IA scheme from between the OIA and the iterative IA based on the calculated predicted throughputs. The communication apparatus may compare the predicted throughputs, and select an IA scheme corresponding to a higher predicted throughput.

In operation 350, the communication apparatus communicates with the user terminal based on the selected IA scheme.

Figure 4:
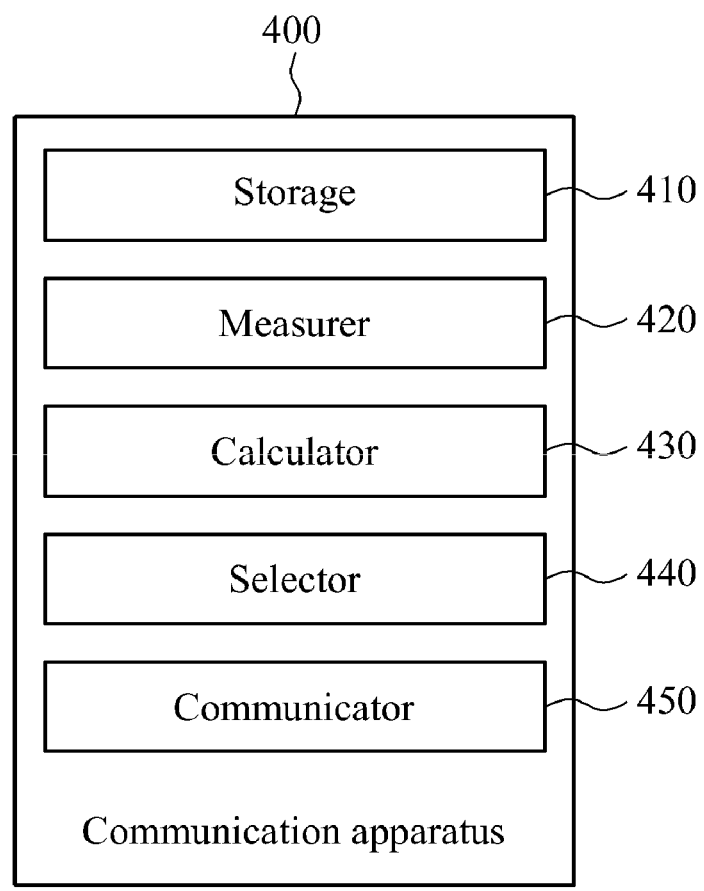
FIG. 4 illustrates a communication apparatus according to an example embodiment.

FIG. 4 illustrates a communication apparatus 400 according to an example embodiment.

Referring to FIG. 4, the communication apparatus 400 includes a storage 410, a measurer 420, a calculator 430, a selector 440, and a communicator 450.

The storage 410 may store maximum throughputs of an OIA and an iterative IA in a memory in a form of a lookup table.

The measurer 420 may measure an environment of a wireless network. For example, the measurer 420 may measure at least one of a number of transmission antennas, a number of reception antennas, a number of user terminals per BSS, a number of communication terminals, and a target SNR in the wireless network.

The calculator 430 may calculate predicted throughputs of the OIA and the iterative IA based on the measured environment of the wireless network.

Also, the calculator 430 may calculate the predicted throughput of the OIA using a sum-rate based on the environment of the wireless network, a frame period, and a scheduling time. The calculator 430 may calculate the predicted throughputs of the iterative IA using a sum-rate based on the environment of the wireless network, a frame period, an iteration time, and a number of iterations of the iterative IA.

The selector 440 may select an IA scheme from between the OIA and the iterative IA based on the calculated predicted throughputs. The selector 440 may compare the predicted throughputs, and select an IA scheme corresponding to a higher predicted throughput.

The communicator 450 may communicate with the user terminal based on the selected IA scheme.

The communication apparatus 400 may calculate a predicted throughput in consideration of quantitative message negotiation duration and select an advantageous IA scheme, thereby performing a wireless communication.

Figure 5:
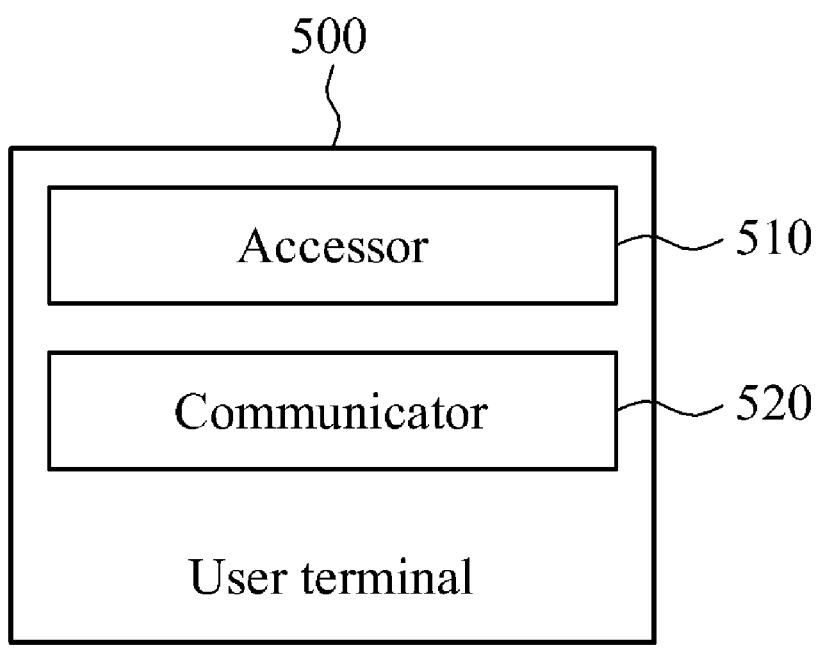
FIG. 5 illustrates a user terminal according to an example embodiment.

FIG. 5 illustrates a user terminal 500 according to an example embodiment.

Referring to FIG. 5, the user terminal 500 includes an accessor 510 and a communicator 520.

The accessor 510 may access a communication apparatus to communicate. In this example, the communication apparatus may be configured to communicate with the user terminal and may include, for example, a base station, an AP, and a relay.

The communicator 520 may communicate with the communication apparatus based on an IA scheme. For example, the communicator 520 may communicate with the communication apparatus based on one of an OIA and an iterative IA.

In this example, the IA scheme may be selected based on a method as described below.

The communication apparatus may measure an environment of a wireless network. For example, the environment of the wireless network may include at least one of a target SNR, a number of user terminals per BSS, a number of communication apparatuses, a number of reception antennas, and a number of transmission antennas in the wireless network.

Also, the communication apparatus may calculate predicted throughputs of the OIA and the iterative IA based on the environment of the wireless network. As an example, the predicted throughputs of the OIA and the iterative IA may be calculated using a frame overhead based on the IA scheme and the environment of the wireless network. For example, the predicted throughput of the OIA may be calculated using a sum-rate based on the environment of the wireless network, a frame period, a scheduling time of the OIA. Also, the predicted throughput of the iterative IA may be calculated using a sum-rate based on the environment of the wireless network, a frame period, an iteration time, and a number of iterations of the iterative IA.

The IA scheme may be selected by the communication apparatus from between the OIA and the iterative IA based on the predicted throughputs. The IA scheme may be, for example, an IA scheme corresponding to a higher predicted throughput between the OIA and the iterative IA.

FIGS. 6 through 9 illustrate sum-rates based on an IA scheme and an SNR according to an example embodiment.

FIGS. 6 through 9 illustrate simulation result values obtained by comparing performances of a plurality of wireless communication schemes including a hybrid scheme. In this example, a simulation parameter may be configured as shown in Table 1.

TABLE 1

| Parameter | Value |
| --- | --- |
| Number of users per network | 10, 50, 100 |
| Number of APs | 3 |
| Number of streams per network | 2 |

TABLE 1-continued

| Parameter | Value |
| --- | --- |
| Number of AP antennas | 4 |
| Number of user antennas | 4, 5 |
| Iteration number for iterative IA | 15 |

In a process of the simulation, the number of user terminals may be changed to "10", "50", and "100", the number of APs may be "3", the number of transmission streams per BSS may be "2", the number of antennas in an AP may be "4", the number of antennas in a user terminal may be changed to "4" and "5", and the number of iterations of the iterative IA may be "15".

Figure 6:
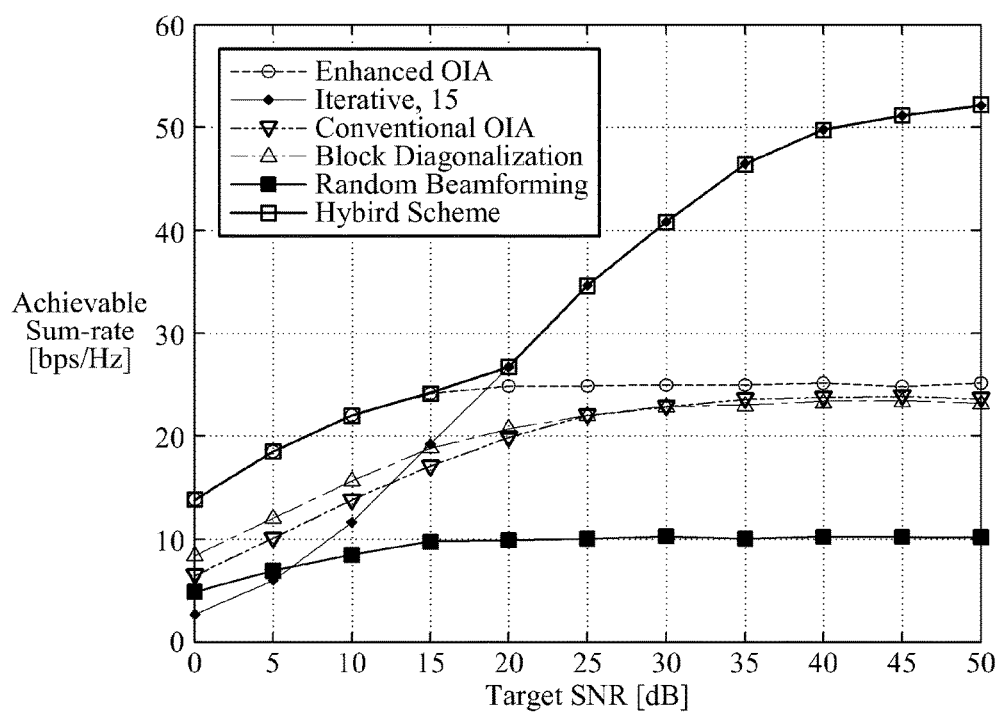
FIGS. 6 through 9 illustrate sum-rates based on an IA scheme and an SNR according to an example embodiment.
Figure 7:
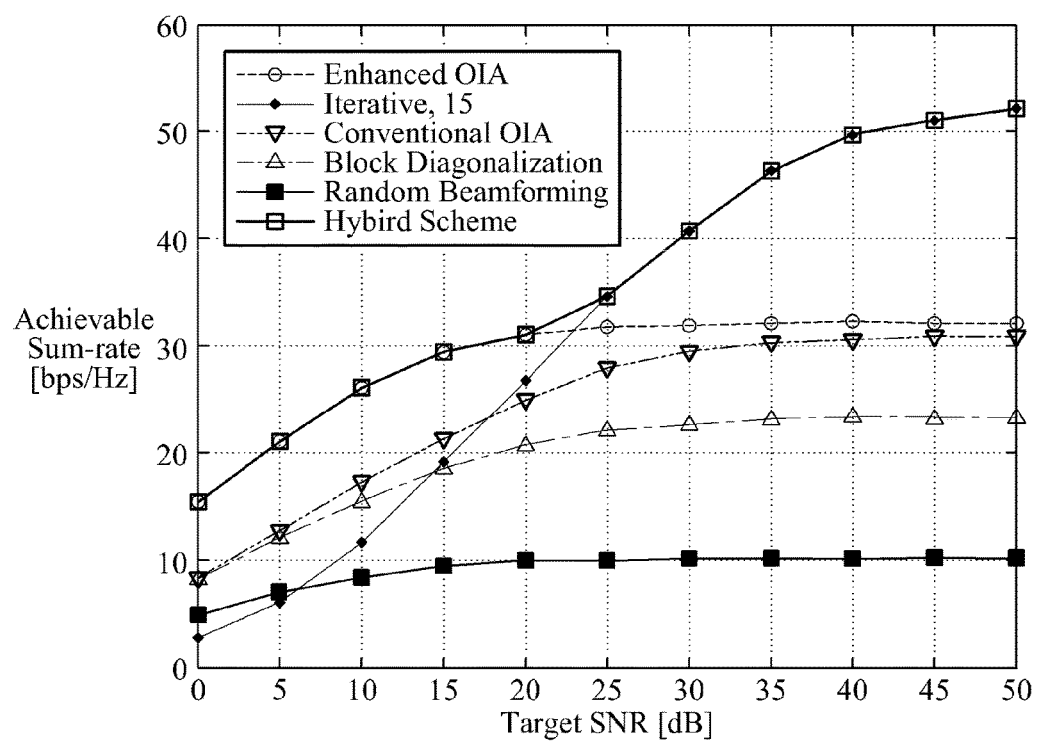
Figure 8:
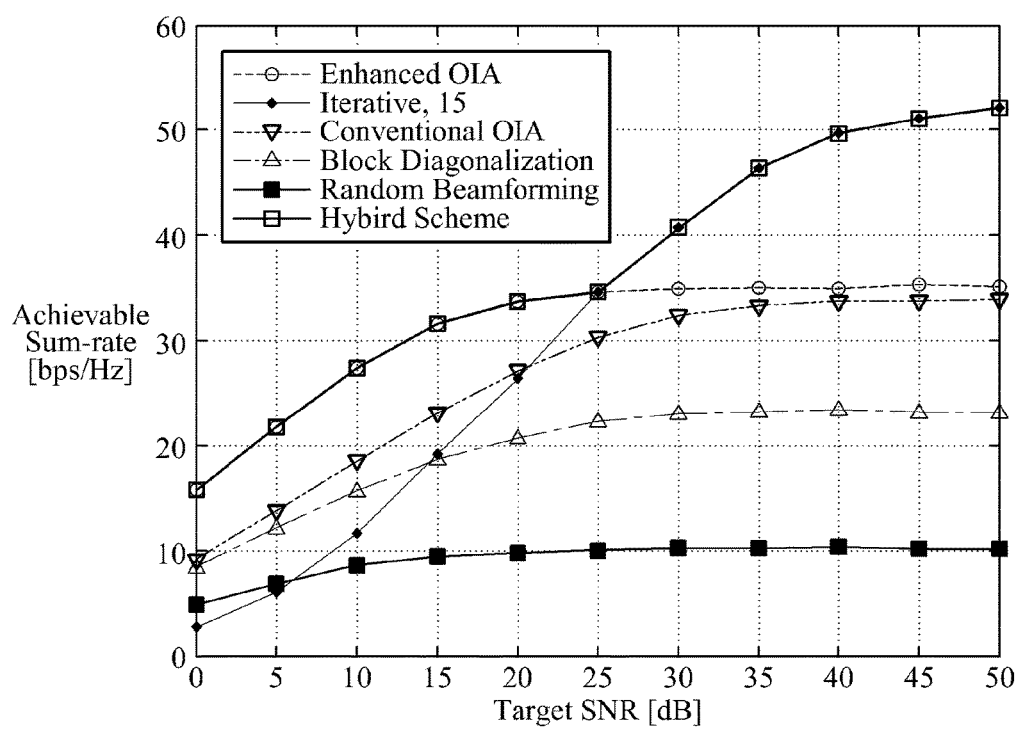

FIGS. 6 through 8 illustrate sum-rates based on the number of user terminals per BSS. FIG. 6 illustrates simulation results of a case in which the number of user terminals per BSS is "10". FIG. 7 illustrates simulation results of a case in which the number of user terminals per BSS is "50". FIG. 8 illustrates simulation results of a case in which the number of user terminals per BSS is "100".

In this example, the number of APs may be "3", the number of transmission streams per BSS may be "2", the number of antennas in an AP may be "4", the number of antennas in a user terminal may be "4", and the number of iterations of the iterative IA may be "15".

In the simulation results, the maximum throughputs of the OIA and the iterative IA may intersect at an interval of SNR between 15 and 25 dB. The hybrid scheme may provide a higher performance when compared to a random beamforming scheme and a block diagonalization scheme. Also, an intersecting point between the OIA and the iterative IA may increase proportionally to the number of user terminals per BSS. For example, an SNR at which an application of the OIA is more advantageous than that of the iterative IA may correspondingly increase according to an increase in the number of user terminals per BSS.

Figure 9:
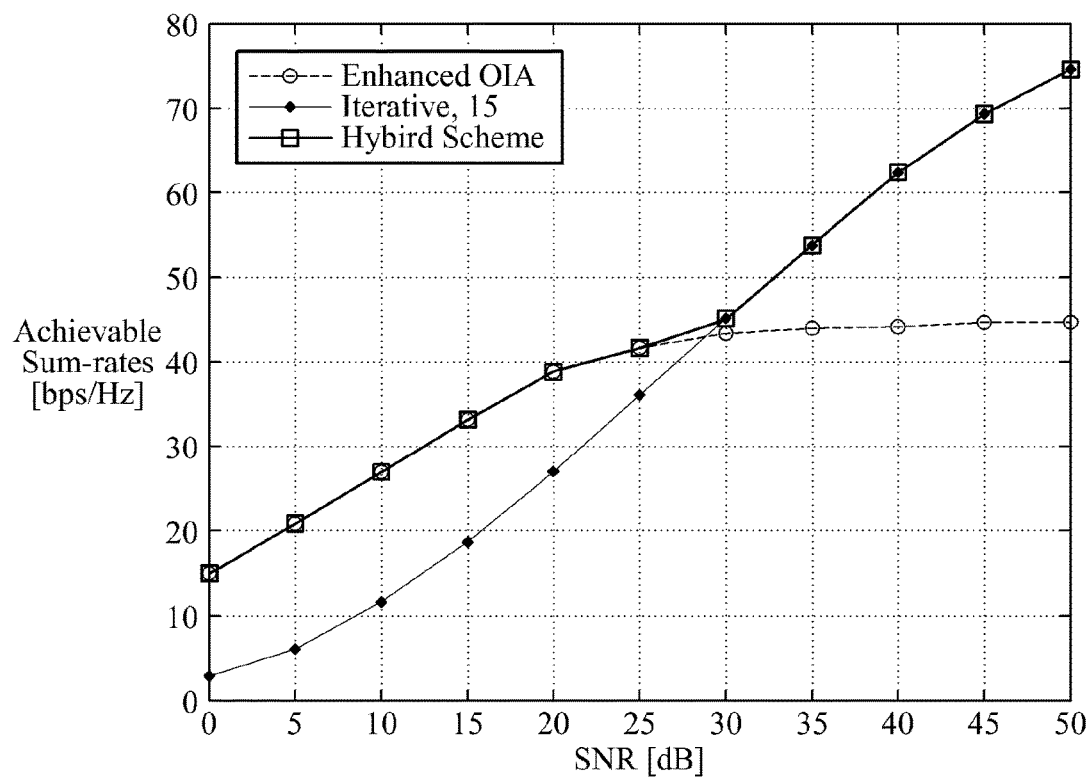

FIGS. 6 and 9 illustrate sum-rates based on the number of antennas in the user terminals. FIG. 6 illustrates simulation results of a case in which the number of antennas in the user terminal is "4". FIG. 9 illustrates simulation results of a case in which the number of antennas in the user terminal is "5".

In this example, the number of user terminals per BSS may be "10", the number of APs may be "3", the number of transmission streams per BSS may be "2", the number of antennas in the AP may be "4", and the number of iterations of the iterative IA may be "15".

In the simulation results, an advantageous IA scheme may be changed based on a point at which the SNR is 30 dB. The intersection between the OIA and the iterative IA may increase proportionally to the number of antennas in the user terminal For example, an SNR at which an application of the OIA is more advantageous than that of the iterative IA may correspondingly increase according to an increase in the number of antennas in the user terminal.

The above simulation result may be based on a feature that a multi-user diversity condition for achieving a multiplexing gain is mitigated in the OIA according to an increase in the number of antennas in the user terminal.

According to an aspect of the present invention, it is possible to complement issues of IA schemes and improve a maximum throughput in a wireless communication by selectively applying an OIA and an iterative IA.

According to another aspect of the present invention, it is possible to adaptively perform communication based on an environment of a wireless network by applying an appropriate IA scheme in consideration of an SNR.

According to still another aspect of the present invention, it is possible to select an advantageous IA scheme and perform wireless communication by calculating a predicted throughput in consideration of quantitative message negotiation duration.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method for downlink multi-user multiple-input multiple-output (MU-MIMO) communication in a wireless local area network (WLAN) performed by a communication apparatus, the method comprising:
   measuring characteristics of an environment of a wireless network formed based on the communication apparatus, the characteristics including a Signal to Noise Ratio (SNR) value;
   determining a predicted opportunistic interference alignment (OIA) throughput of an OIA scheme using a frame period and a sum-rate based on the measured characteristics;
   determining a predicted iterative IA throughput of an iterative IA scheme using a frame period and a sum-rate based on the measured characteristics;
   comparing the predicted OIA throughput to the predicted iterative IA throughput;
   when the predicted OIA throughput is greater than the predicted iterative IA throughput, selecting the OIA throughput as an IA scheme;
   when the predicted iterative IA throughput is greater than the predicted OIA throughput, selecting the IA throughput as an IA scheme;
   when the predicted OIA throughput is equal to the predicted iterative IA throughput, selecting the OIA throughput or the iterative IA throughput as an IA scheme, and
   performing wireless communication with a user terminal in the WLAN using the selected IA scheme with the greater predicted throughput.

2. The method of claim 1, wherein the predicted throughputs of the OIA and the iterative IA are determined in consideration of a frame overhead based on the selected IA scheme and the environment of the wireless network.

3. The method of claim 1, wherein determining the predicted throughput of the iterative IA further comprises using an iteration time and a number of iterations of the iterative IA.

4. The method of claim 1, wherein the measured characteristics further comprise at least one of a number of user terminals in a Basic Service Set (BSS) with the access point and a number of transmission streams in the BSS, a number of transmission antennas for an access point, and a number of reception antennas at a user terminal in a BSS with the access point.

5. A wireless access point comprising:
   a plurality of multi-user multiple-input multiple-output (MU-MIMO) antennas that simultaneously receive radio frequency (RF) signals from an access point according to an interference alignment (IA) scheme and measure radio signals to determine an SNR value; and
   a processing device to:
      determine a predicted opportunistic interference alignment (OIA) throughput of an OIA scheme using a frame period, and a sum-rate based on the measured characteristics;

determine a predicted iterative IA throughput of an iterative IA scheme using a frame period, a number of iterations of the iterative IA scheme, and a sum-rate based on the measured characteristics;

compare the predicted OIA throughput to the predicted iterative IA throughput;

when the predicted OIA throughput is greater than the predicted iterative IA throughput, select the OIA throughput as an IA scheme;

when the predicted iterative IA throughput is greater than the predicted OIA throughput, select the iterative IA throughput as an IA scheme; and when the predicted OIA throughput is equal to the predicted iterative IA throughput, selecting the OIA throughput or the iterative IA throughput as an IA scheme, wherein the wireless access point performs wireless communication with a user terminal using the selected IA scheme.

6. The access point of claim 5, wherein the processing device determines the predicted OIA throughput and IA throughput in consideration of a frame overhead based on the IA scheme and an environment of the wireless network formed based on the communication apparatus.

7. The access point of claim 5, wherein determining the predicted throughput of the iterative IA uses an iteration time and a number of iterations of the iterative IA.

8. The access point of claim 5, wherein the processing device determines the predicted OIA throughput and the iterative IA throughput using at least one of a number of user terminals in a Basic Service Set (BSS) with the access point, a number of transmission streams in the BSS, a number of transmission antennas for the access point, and a number of reception antennas at a user terminal in a BSS with the access point.

9. The access point of claim 8, further comprising:

a storage that stores maximum throughputs of an OIA and an iterative IA in a memory in a form of a lookup table.

* * * * *